(12) United States Patent
Wu et al.

(10) Patent No.: US 12,094,200 B1
(45) Date of Patent: Sep. 17, 2024

(54) MONITORING METHOD FOR WHEAT KERNEL MOISTURE CONTENT IN-FIELD BASED ON PLANETSCOPE SATELLITE IMAGERY

(71) Applicant: WUHAN UNIVERSITY, Hubei (CN)

(72) Inventors: Zhaocong Wu, Hubei (CN); Junhan Luo, Hubei (CN); Haoyu Lin, Hubei (CN); Siqing Zhang, Hubei (CN); Zhixiong Dai, Hubei (CN); Weihua Lin, Hubei (CN); Yixian Yue, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/502,069

(22) Filed: Nov. 5, 2023

(30) Foreign Application Priority Data

Jun. 8, 2023 (CN) .......................... 202310674603.9

(51) Int. Cl.
*G06V 20/10* (2022.01)
*G06V 20/13* (2022.01)
(52) U.S. Cl.
CPC ............ *G06V 20/188* (2022.01); *G06V 20/13* (2022.01); *G06V 20/194* (2022.01)
(58) Field of Classification Search
None
See application file for complete search history.

(56) References Cited

U.S. PATENT DOCUMENTS

| 2018/0132423 A1* | 5/2018 | Rowan | A01C 21/005 |
| 2020/0134485 A1* | 4/2020 | Sood | A01B 79/005 |

FOREIGN PATENT DOCUMENTS

| CN | 102156128 | | 8/2011 |
| CN | 102156128 A | * | 8/2011 |
| CN | 111798028 | | 10/2020 |

(Continued)

OTHER PUBLICATIONS

Cheng Xiaojuan et al., "Retrieval of winter wheat canopy water content from near-earth hyperspectral and TM remote sensing images", Journal of Triticeae Crops, Jan. 2014, submit with English translation, pp. 1-16.

(Continued)

*Primary Examiner* — James M Anderson, II
(74) *Attorney, Agent, or Firm* — JCIP GLOBAL INC.

(57) ABSTRACT

The monitoring method for wheat kernel moisture content in-field based on PlanetScope satellite imagery in this disclosure comprises: (1) data collection and database establishment; (2) feature engineering: constructing various broad-band indices on the original bands provided by PlanetScope to expand the feature domain, and evaluate the importance of each feature to rank the features based on the comprehensive importance calculated by permutation importance based on regressors; (3) model construction: progressively adding the spectral features one by one as independent variables to the GBDT model according to the ranking results, and screen out the optimal spectral feature domain and inversion model for wheat kernel moisture content; (4) wheat kernel moisture content mapping. The disclosure utilizes machine learning inversion models based on spectral features and PlanetScope satellite imagery to obtain the wheat kernel moisture content at any position of the target farmland.

8 Claims, 7 Drawing Sheets

(56) References Cited

FOREIGN PATENT DOCUMENTS

| | | | |
|---|---|---|---|
| CN | 111798028 A | * | 10/2020 |
| IN | 201741025064 | | 1/2019 |
| KR | 102034994 | | 10/2019 |
| WO | WO-2020155458 A1 | * | 8/2020 |
| WO | 2021255458 | | 12/2021 |

OTHER PUBLICATIONS

Wu Zhaocong et al., "Multi spectral image quality assessment of GF-1 and SPOT-7 based on the authenticity of thousands of surface parameters", Journal of Image and Graphics, Nov. 2016, submit with English translation, pp. 1-22.

"Search Report of China Counterpart Application", issued on Jul. 4, 2023, with English translation thereof, pp. 1-6.

* cited by examiner

RFR
FIG. 3A

MONITORING METHOD FOR WHEAT KERNEL MOISTURE CONTENT IN-FIELD BASED ON PLANETSCOPE SATELLITE IMAGERY

CROSS-REFERENCE TO RELATED APPLICATION

This application claims the priority benefit of Chinese patent application NO. 202310674603.9, filed on Jun. 8, 2023. The entirety of the above-mentioned patent application is hereby incorporated by reference herein and made a part of this specification.

TECHNICAL FIELD

This disclosure relates to the field of spectral detection, wheat quality monitoring, and machine learning, and in particular to a method for monitoring the wheat kernel moisture content in-field based on PlanetScope satellite imagery.

BACKGROUND

Wheat is one of the most important grain crops for humans and the second largest grain crop in China. The wheat kernel moisture content is a crucial parameter that affects the performance of harvest machinery, the safety of grain storage, and quality for consumption and planting. According to Chinese regulations, the moisture content of commercial wheat for purchase, storage, transport, process and sales shall not exceed 12.5%. Wheat that meets the drying standard can sell with higher purchase price. Therefore, artificial drying is required for wheat that does not meet the moisture content standard at harvest, which incurs additional expenses and consumes fuel resources.

The current methods for measuring the wheat kernel moisture content can be categorized into direct and indirect methods. Direct methods refer to techniques that involve grinding or altering the properties of the grains during the measuring process, such as drying and chemical methods. Although these methods provide reliable and accurate measurements, they are not efficient enough. Non-destructive monitoring methods, on the other hand, involve analyzing the wheat kernel moisture content without changing their physical, chemical, or optical properties. These methods utilize the inherent characteristics of the grains, such as their physical, chemical, and optical properties, i.e. dielectric measurement, acoustic measurement, and spectroscopic measurements. These methods are non-destructive and have shorter response times. However, the current methods for measuring the wheat kernel moisture content are only applicable to post-harvest wheat trade and cannot be widely used for pre-harvest field monitoring. Therefore, exploring methods to monitor pre-harvest wheat kernel moisture content in-field and understanding its variation regulation, can effectively assist in scientific decision-making for agricultural management, ensuring that the moisture content of harvested wheat meets national standards. This not only helps protect grain resources and improve economic benefits, but also enhances the thermal energy utilization of the natural environment, promotes environmental friendliness, and contributes to sustainable development of resources.

Satellite remote sensing methods have been proven to be an effective method for estimating the crop quality parameters on large-scale, and is widely used in monitoring other wheat quality parameters such as yield and protein content. However, there is currently limited research on monitoring wheat kernel moisture content based on remote sensing methods.

SUMMARY

For the problem in the prior arts, the disclosure utilizes satellite remote sensing approach with high-throughput, high-precision, and non-destructive advantages to monitor the wheat kernel moisture content on large-scale, which can effectively address the insufficient data support in agricultural decision-making and research. For above mentioned purpose, this disclosure provides an inversion method for monitoring the wheat kernel moisture content in-field based on multispectral satellite imagery from PlanetScope. By using selected spectral features sensitive to wheat kernel moisture content, the method enables precise monitoring for wheat kernel moisture content in-field The disclosure provides the following technical solution: a method for monitoring wheat kernel moisture content in-field based on PlanetScope satellite imagery, which includes the following steps:

S1, setting up quadrats in a target farmland, recoding the coordinates of the quadrats, collecting wheat ears within the quadrats, and measuring the wheat kernel moisture content in each quadrat;

S2, obtaining PlanetScope eight-band surface reflectance imagery covering the target farmland;

S3, based on multispectral image data obtained in S2 and the coordinates of the quadrats in S1, extracting canopy spectral reflectances corresponding to the wheat kernel moisture content in the different quadrats;

S4, constructing a plurality of broad-band vegetation indices based on original bands provided by PlanetScope to expand spectral feature domain;

S5, using the original bands and the constructed broad-band vegetation indices in S4 as the input into the regressors, and utilizing permutation importance to comprehensively evaluate the importance of expanded spectral features on the regressors, so as to rank all the expanded spectral features based on the comprehensively evaluated importance;

S6, Based on the gradient boosting decision tree (GBDT), gradually adding the spectral features as independent variables into a GBDT model one by one according to ranking result obtained in S5, so as to obtain an optimized spectral feature domain and GBDT inversion model for wheat kernel moisture content; and S7, utilizing the optimized GBDT inversion model for wheat kernel moisture content having optimal spectral feature domain in S6, along with PlanetScope satellite remote sensing imagery, to estimate the wheat kernel moisture content in each location of the target farmland.

Furthermore, in S1: the coordinate of each center quadrat is preciously positioned by the Beidou probe. Preferably, five wheat ears were randomly collected within each quadrat and the wheat kernel moisture content is measured using the drying method.

Furthermore, wherein S1 includes: using drying method to measure the wheat kernel moisture content.

In detail, drying method to measure the wheat kernel moisture content includes: weighting the fresh weight of wheat kernels using a high-precious electronic balance. Then, placing the wheat kernels into the drying oven. The dying process consists of two stages: In the first stage, setting the oven temperature to 130° C. and dry the wheat kernels for 1 h. In the second stage, setting the oven temperature to 85° C. and continuing drying until the weight of the wheat kernels remains constant. Finally, weighting the dried weight of wheat kernels using the high-precision electronic balance. The calculation formula for the wheat kernel moisture content is as follows:

$$M = \frac{W_1 - W_2}{W_1} \times 100\%$$

where M represents wheat kernel moisture content, $W_1$ represents the fresh weight, $W_2$ represents the dried weight.

Furthermore, spectral reflectance respectively corresponding to the eight-band surface reflectance imagery in S2 includes: B1, B2, B3, B4, B5, B6, B7, B8.

Furthermore, the broad-band vegetation indices in S4 includes: Enhanced Vegetation Index (EVI), EVI, Green Normalized Difference Vegetation Index (GNDVI), Normalized Difference Vegetation Index (NDVI), Plant Senescence Reflectance Index (PSRI), Red Edge Chlorophyll Index (RECI), Red Edge Normalized Difference (RENDVI), Ratio Vegetation Index (RVI), Soil-Adjusted Vegetation Index (SAVI), Visible Atmospherically Resistant Index (VARI), and Wide Dynamic Range Vegetation Index (WDRVI).

Furthermore, the calculations of the broad-band vegetable indices are as follows:

EVI=2.5×(B8−B6)/((B8+6×B6−7.5×B2)+1);

RENDVI=(B8−B7)/(B8+B7);

GNDVI=(B8−B4)/(B8+B4);

RVI=B8/B6 NDVI=(B8−B6)/(B8+B6);

SAVI=1.5×(B8−B6)/(B8+B6+L);

PSRI=(B6−B2)/B7;

VARI=(B4−B6)/(B4+B6−B2);

RECI=(B8/B7)−1;

WDRVI=(0.1×B8−B6)/(0.1×B8+B6).

Furthermore, the regressors include: Partial Least Squares Regression (PLSR), Random Forest Regression (RFR), and Support Vector Regression (SVR), wherein the comprehensively evaluated importance of expanded spectral features on the regressors are determined by taking the average of importance of the PLSR, the RFR and the SVR regressors.

Furthermore, S6 including: the optimized GBDT inversion model for wheat kernel moisture content is constructed by:
 randomly dividing wheat kernel moisture content samples into the training set and testing set;
 ranking the expanded spectral features in descending order based on the comprehensively evaluated importance in S5;
 inputting number one of the ranked expanded spectral feature as the independent variable into the GBDT model to evaluate $R^2$ of the GBDT model on the training set and testing set;
 inputting number 1 and next one of the expanded spectral feature as the independent variable into the GBDT model to reconstruct the GBDT model and evaluating $R^2$ of the GBDT model on the training set and testing set again;
 repeating the foregoing step by incrementally increasing the total number of inputted expanded spectral features until all expanded spectral feature are inputted at once, so as to obtain variation curve of $R^2$ on the training and testing set of the GBDT model under different feature dimensions; and
 identifying inflection point on the R2 curve, and selecting GBDT model corresponding to the inflection point as the optimized GBDT inversion model.

Furthermore, S7 including:
 according to optimal spectral feature domain in S6, extracting the desired original bands from original imagery acquired from S2 and calculating desired broad-band vegetation indices to reconstruct multi-dimensional image; and
 inputting the multi-dimensional image pixel by pixel into the optimized GBDT inversion model in S6, so as to obtain distribution map of wheat kernel moisture content of the target farmland.

The disclosure has the following beneficial effects:

This disclosure considers the feature importance evaluation results of multiple regressors with GBDT model to comprehensively evaluate the sensitivity of each feature to wheat kernel moisture content and then select highly sensitive features that are widely applicable.

This disclosure maps the distribution of wheat kernel moisture content in-field accurately based on PlanetScope satellite remote sensing imagery, which is easy to operate and efficient, bridging the current gap in wheat kernel moisture content in-field pre-harvest and providing richer information for agricultural decision-making.

DETAILED DESCRIPTIONS OF THE EMBODIMENTS

The technical solution of the embodiments of the disclosure will be fully and clearly described in combination with the embodiments of the disclosure.

The monitoring method for wheat kernel moisture content in-field based on PlanetScope satellite imagery proposed in the disclosure, includes the following steps:

S1, collecting wheat kernel moisture content sample data. First, setting up a total of 25 quadrats in the target farmland. The quadrats should be evenly distributed throughout the farmland. Using the handheld GPS probe to record the coordinates of the center point of each quadrat. Then, regular sampling should be carried out during the wax and full ripe stage, with 5 wheat ears in each quadrat collected randomly. The average moisture content of the 5 wheat ears is measured as the observed value for the quadrat. During the measuring process, the accuracy of the high-precision balance used is 0.001 g. The fresh weight of wheat ears was measured, then wheat ears were placed in the oven for drying. After dying completed, measuring the dry weight of the wheat ears. The drying process is divided into two stages. In the first stage, setting the oven temperature to 130° C. and dry the wheat kernels for 1 h. In the second stage, setting the oven temperature to 85° C. and continuing drying until the weight of the wheat kernels remains constant. The calculation formula for the wheat kernel moisture content is as follows:

$$M = \frac{W_1 - W_2}{W_1} \times 100\%$$

where M represents wheat kernel moisture content, $W_1$ represents the fresh weight, $W_2$ represents the dried weight.

S2, based on the location of the target farmland and time range, selecting cloud-free PlanetScope satellite imagery within the spatial and temporal boundaries. The website for accessing the satellite images is https://account.planet.com/. The dates of collected cloud-free satellite images are 17 May, 21 May and 25 May 2022. The spectral range parameters for the eight bands of PlanetScope are listed in the following table:

| Band Number | Spectral Range |
| --- | --- |
| B1 | 431-452 nm |
| B2 | 465-515 nm |
| B3 | 513-549 nm |
| B4 | 547-583 nm |
| B5 | 600-620 nm |
| B6 | 650-680 nm |
| B7 | 697-713 nm |
| B8 | 845-885 nm |

Figure 1:
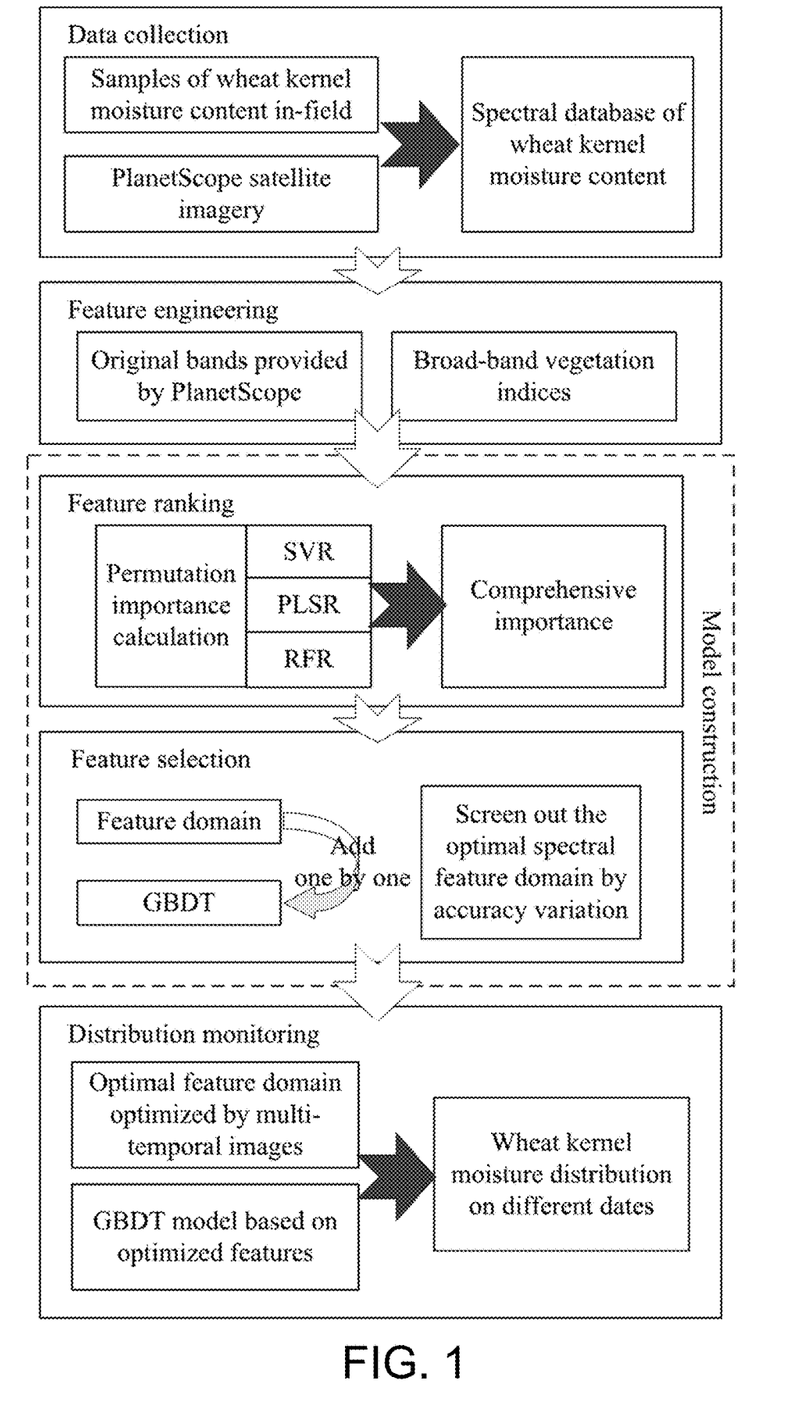
FIG. 1 is a flowchart illustrating the method of the disclosure.
Figure 2:
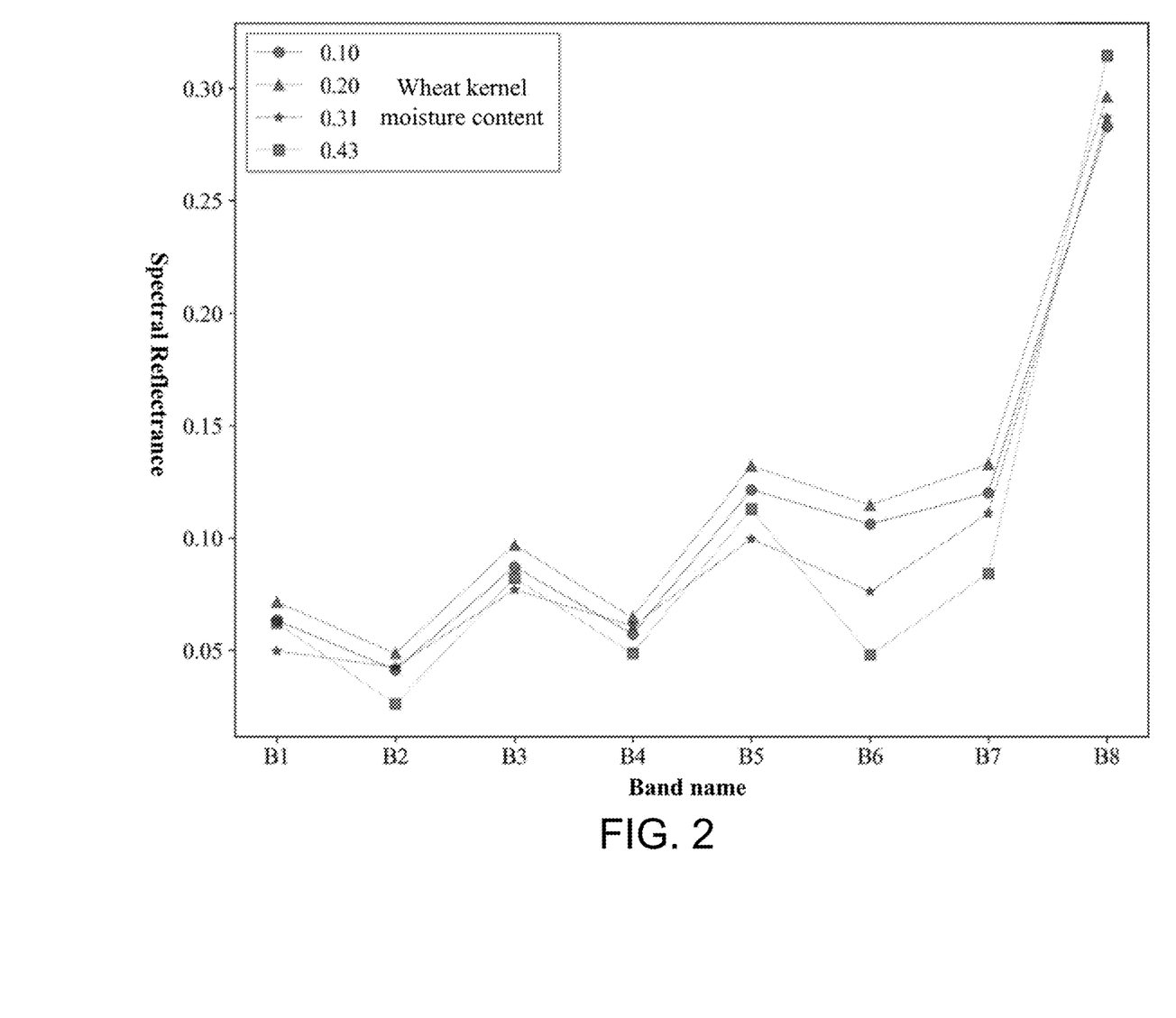
FIG. 2 is a plot illustrating the spectral reflectance of PlanetScope bands under different wheat kernel moisture content.

S3, extracting the eight-band multispectral curves on the pixel of acquired images corresponding to the locations of the quadrats. Associating these curves with the measured wheat kernel moisture content. Building the spectral database that establishes the relationship between PlanetScope canopy spectra and wheat kernel moisture content. The multispectral curves of different wheat kernel moisture content are shown in FIG. 2. In this implementation, each band consists of 55 sampling data, and each quadrat can include multiple dates of collected samples.

S4, Further calculations of various broad-band vegetation indices are performed to enhance the spectral features. The broad-band vegetation indices include EVI, GNDVI, NDVI, PSRI, RECI, RENDVI, RVI, SAVI, VARI, and WDRVI. The formulas for calculating these vegetation indices are as follows:

$EVI=2.5\times(B8-B6)/((B8+6\times B6-7.5\times B2)+1)$ $RENDVI=(B8-B7)/(B8+B7);$ $GNDVI=(B8-B4)/(B8+B4);$ $RVI=B8/B6 \ NDVI=(B8-B6)/(B8+B6);$ $SAVI=1.5\times(B8-B6)/(B8+B6+L);$ $PSRI=(B6-B2)/B7;$ $VARI=(B4-B6)/(B4+B6-B2);$ $RECI=(B8/B7)-1;$ $WDRVI=(0.1\times B8-B6)/(0.1\times B8+B6).$ S5, using the original spectral bands and the broad-band vegetation indices constructed in S4 as input feature variables, to construct PLSR, RFR and SVR models. This regression models are built using the sklearn package of Python. The important parameter configurations for each regression model are as follows: principal components (n_components) for PLSR is set to 7; the maximum depth (max_depth) for RFR is set to 8; number of sub-trees (n_estimators) is set to 20, and the kernel function for SVR is set as radial basis function(rbf). The importance of each feature are evaluated in the three regression models by permutation importance. Permutation importance measures the importance of a feature by calculating the increase in the prediction error that the model puts into the model after feature replacement. If changing the value of the feature significantly increases the model's error, then the feature is important.

Figure 3A:
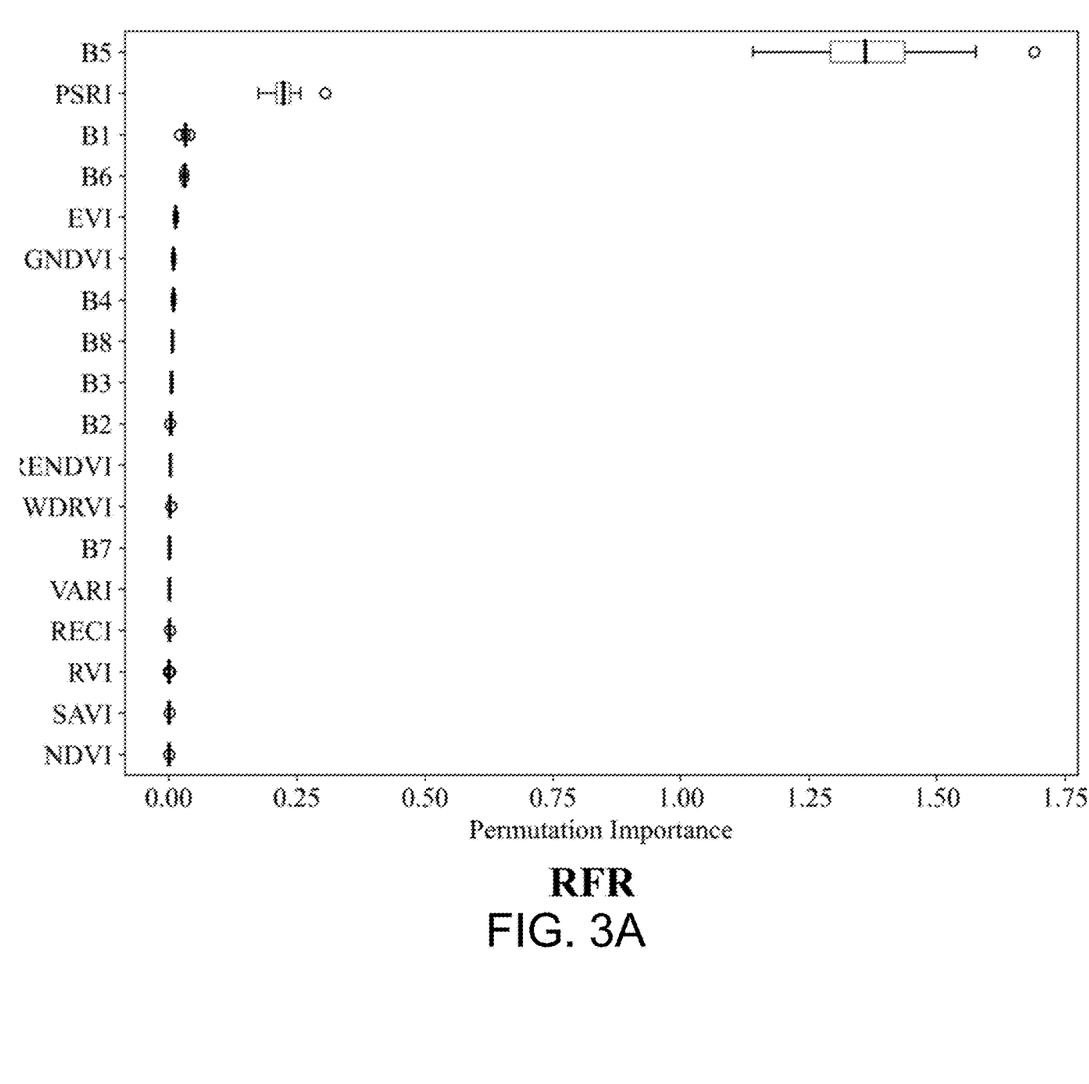
FIG. 3A is a boxplot illustrating the distribution of permutation importance for various features in the Random Forest Regression (RFR) model.
Figure 3B:
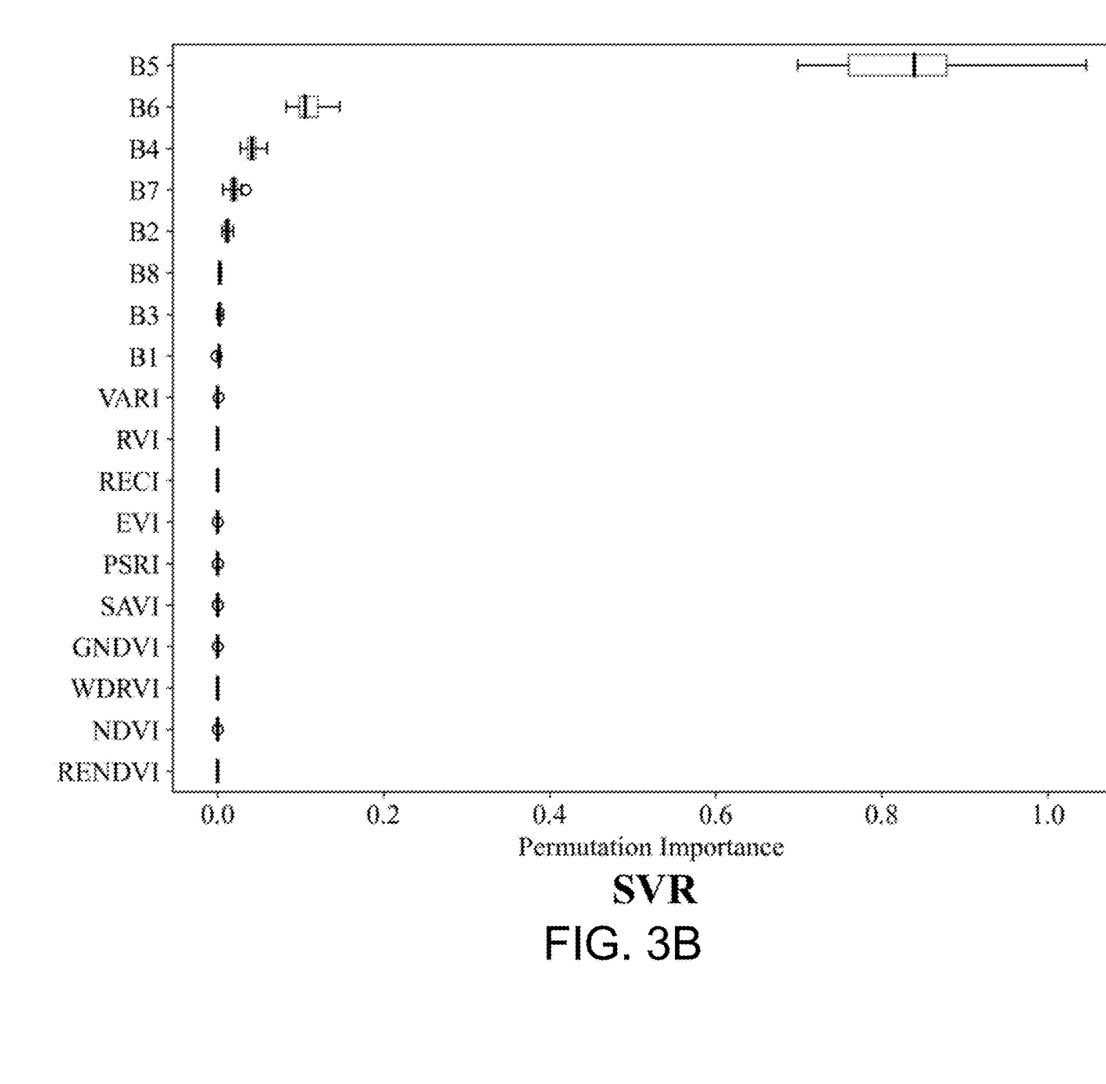
FIG. 3B is a boxplot illustrating the distribution of permutation importance for various features in the Support Vector Machine Regression (SVR) model.
Figure 3C:
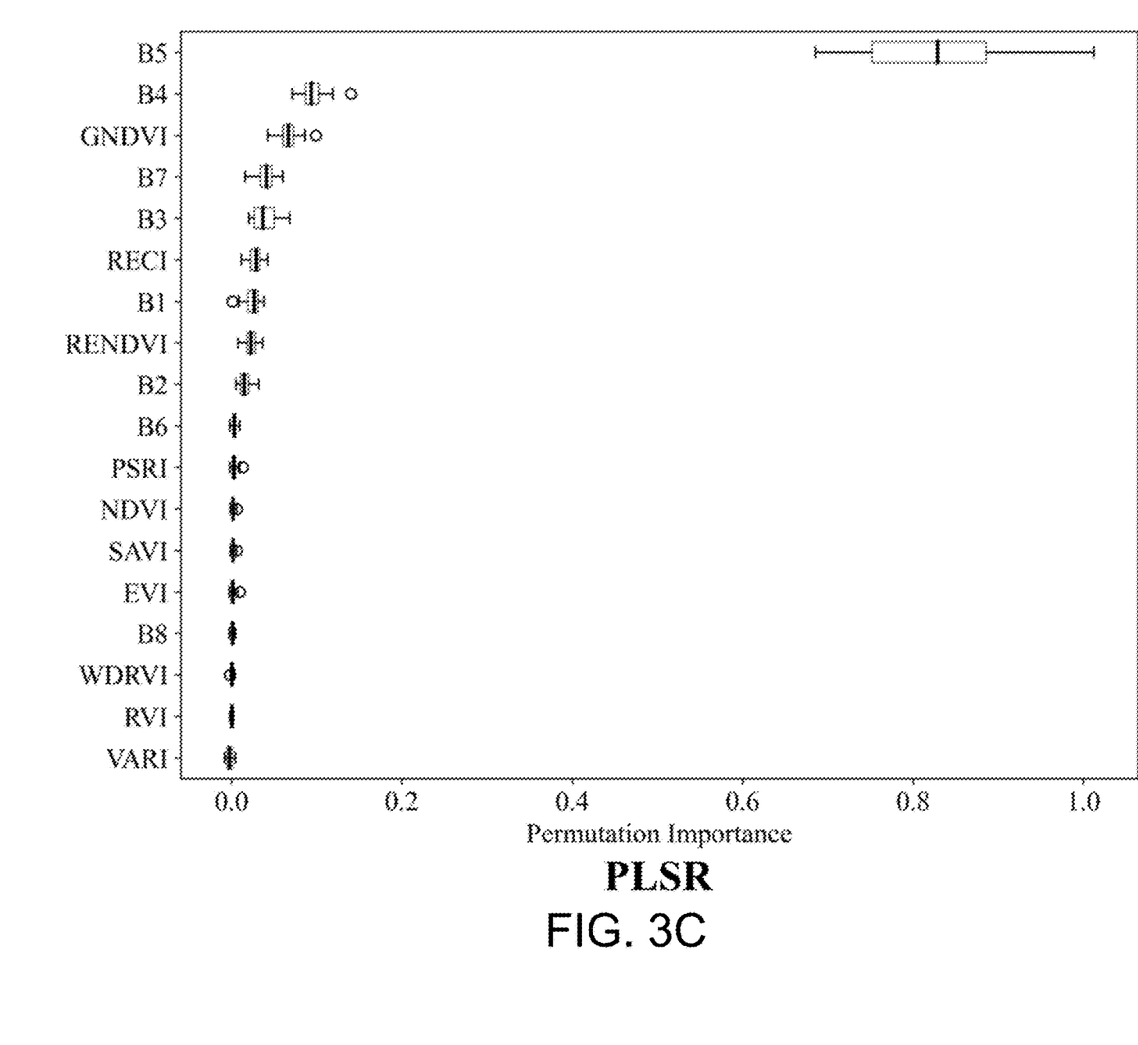
FIG. 3C is a boxplot illustrating the distribution of permutation importance for various features in the Partial Least Squares Regression (PLSR) model.
Figure 4:
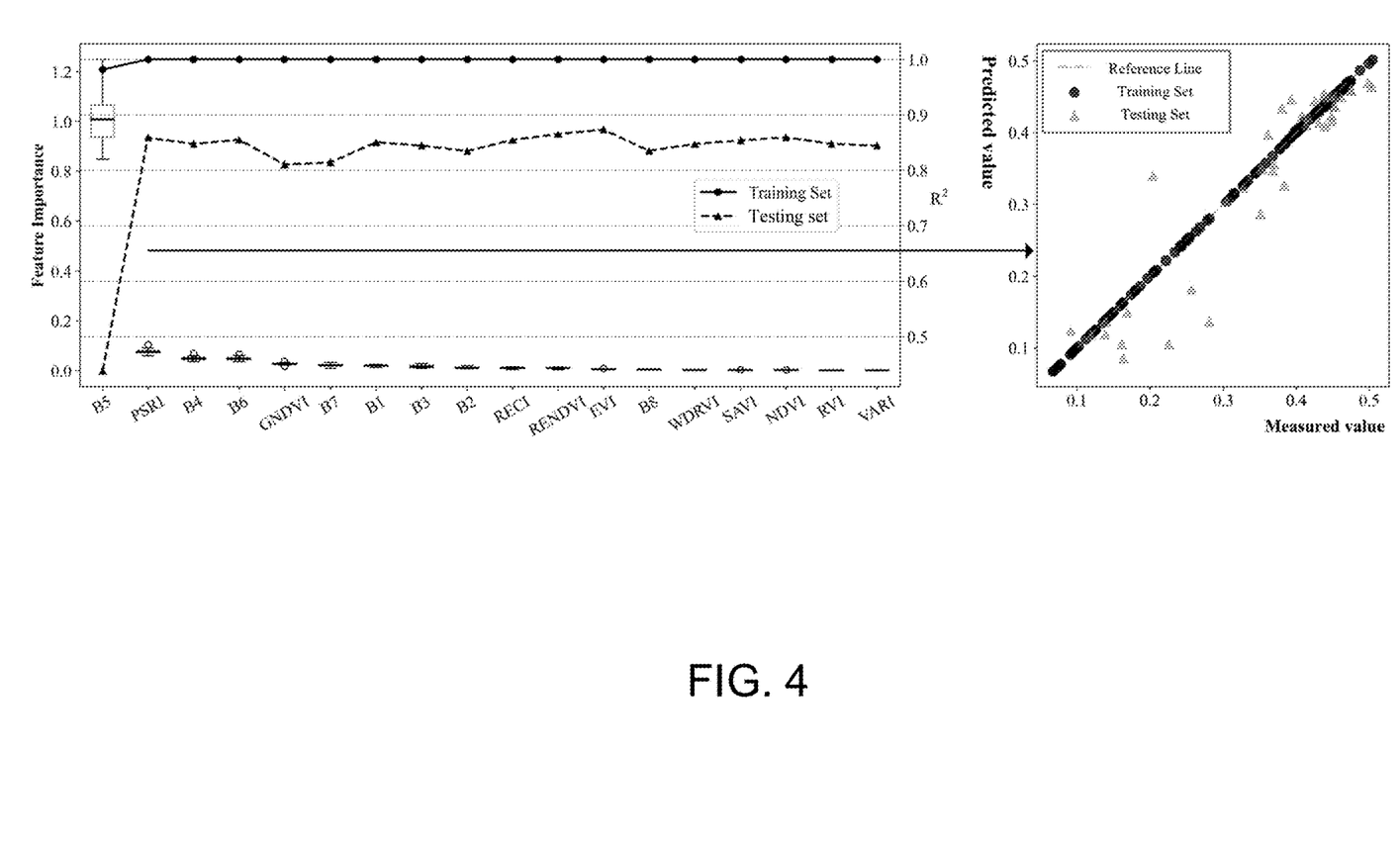
FIG. 4 contains two graphs. The left graph is a boxplot illustrating the comprehensive importance of each feature and the variation of the $R^2$ on the training and testing set with gradual addition of feathers into the GBDT model. The right graph is a scatter plot illustrating the comparison of measured value and predicted value by the model at the inflection point of accuracy.

The number of replacement used for permutation importance is set to 5. The importance of each feature variable in the different regression models (regressors) are shown in FIG. 3A to FIG. 3C. After calculating the importance of each feature in three regression models, calculating the average of the importance of each feature in three regression models as the comprehensive importance. The comprehensive importance of each feature variable is shown in the left diagram of FIG. 4.

S6, the wheat kernel moisture content sampling database will be randomly divided into training and testing set, with the testing set including 20% of the total sample size.

Utilizing the GBDT model to build the inversion model for wheat kernel moisture content. The GBDT model is built based on the sklearn package of Python, with the parameter configurations as follows: the maximum depth(max_depth) is set to 8; number of sub-trees (n_estimators) is set to 70.

The first step in GBDT modeling is to initialize a tree with only the root node as the base learner. Then, multiple base learners are built, and the negative gradient of the loss function under the current model is calculated as an estimation of the residual. Next, a regression tree is created to fit this residual and minimize the loss function as much as possible in the leaf nodes of the fitted tree. Finally, the learners are updated to improve prediction performance.

According to the descending order of comprehensive feature importance, starting with the top-ranked features and input it as the independent variable into the GBDT model, and evaluating the $R^2$ (coefficient of determination) of the model on the training and testing set. Then, adding the second-ranked feature to the model and evaluating the $R^2$ of the model on the training and testing set. Repeating the process above by gradually increasing the number of features to obtain the variation curve of $R^2$ on training and testing set under different feature dimensions, which is shown in the left graph of FIG. 4. The feature domain and model corresponding to the inflection point with the largest change in the curve of $R^2$ are selected as the final optimized feature set and the optimal inversion model. The selected features are B5 and PSRI. The scatter plot of the measured and predicted values of the model on the training and training set is shown in the right diagram of FIG. 4. The $R^2$ on the training set is 0.99, and the $R^2$ on the validation set is 0.85.

Figure 5A:
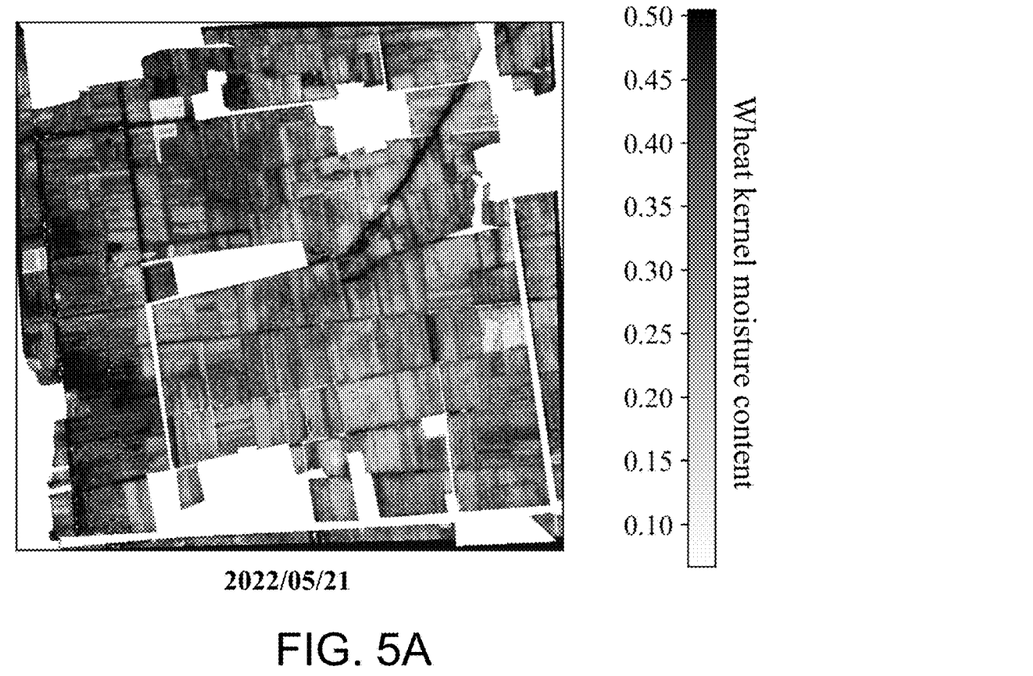
FIGS. 5A and 5B are distribution maps illustrating the wheat kernel moisture content in the farm land on 21 May and 25 May 2022.
Figure 5B:
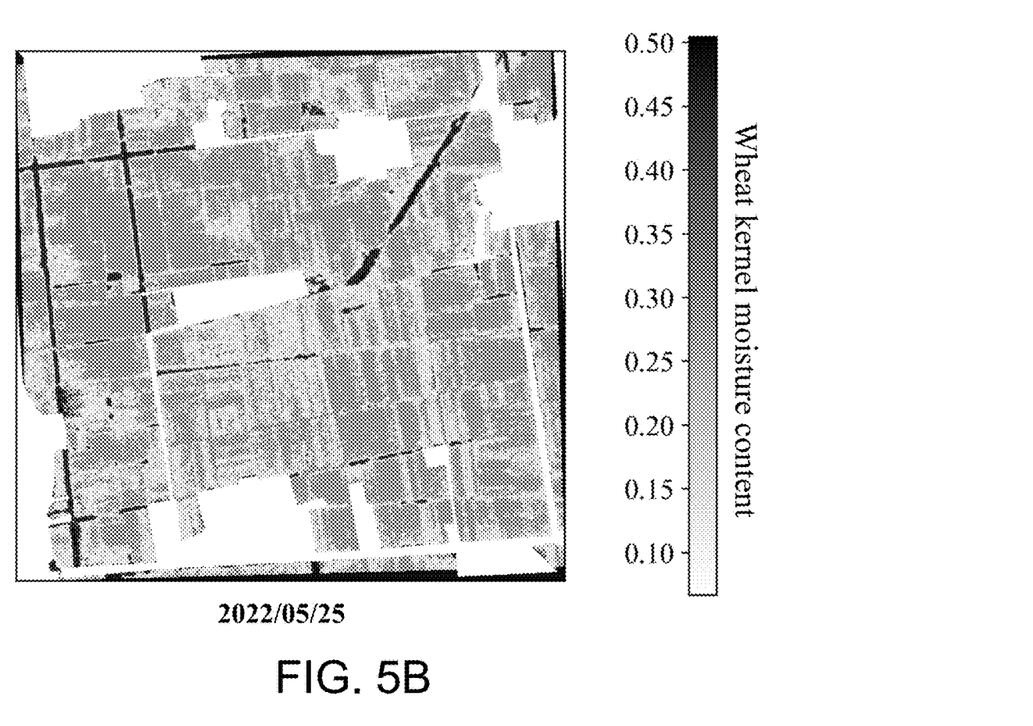

S7, based on the original imagery acquired from S2, the B5 band is extracted and the PSRI index is calculated to reconstruct a two-dimensional image. Then, all wheat pixel values in the image are inputted pixel by pixel into the GBDT inversion model based on the B5 and PSRI features to invert the final distribution map of wheat kernel moisture content in-field. The wheat kernel moisture content distribution maps on 21 and 25 May are shown in FIGS. 5A and 5B.

The above description is only the preferred embodiment of the disclosure, but the protection scope of the disclosure is not limited thereto. Any modifications, equivalents, and improvements to this disclosure made by those skilled in the art without departing from the spirit and scope of this disclosure, should be included within the protection scope of the disclosure.

What is claimed is:

1. A method for monitoring wheat kernel moisture content in-field based on PlanetScope satellite imagery, the method comprising:
   step 1 (S1), setting up quadrats in a target farmland, recoding the coordinates of the quadrats, collecting wheat ears within the quadrats, and measuring the wheat kernel moisture content of the collected wheat ears from each quadrat;
   step 2 (S2), obtaining PlanetScope eight-band surface reflectance imagery covering the target farmland;
   step 3 (S3), based on multispectral image data obtained in S2 and the coordinates of the quadrats in S1, extracting canopy spectral reflectances corresponding to the wheat kernel moisture content in the different quadrats;
   step 4 (S4), constructing a plurality of broad-band vegetation indices based on original bands provided by PlanetScope to expand spectral feature domain;
   step 5 (S5), using the original bands and the constructed broad-band vegetation indices in S4 as the input into regressors, and utilizing permutation importance to comprehensively evaluate the importance of expanded spectral features on the regressors, so as to rank all the expanded spectral features based on the comprehensively evaluated importance;
   step 6 (S6), Based on the gradient boosting decision tree (GBDT), gradually adding the expanded spectral features as independent variables into a GBDT model one by one according to the ranking result obtained in S5, so as to obtain an optimized spectral feature domain and GBDT inversion model for wheat kernel moisture content; and
   step 7 (S7), utilizing the optimized GBDT inversion model for wheat kernel moisture content having optimal spectral feature domain in S6, along with PlanetScope satellite remote sensing imagery, to estimate the wheat kernel moisture content in wheat ears of each quadrat of the target farmland.

2. The method for monitoring wheat kernel moisture content in-field based on PlanetScope satellite imagery of claim 1, wherein S1 comprising:
   using drying method to measure the wheat kernel moisture content.

3. The method for monitoring wheat kernel moisture content in-field based on PlanetScope satellite imagery of claim 1, wherein S2 comprising:
   the eight-band surface reflectance imagery in S2 comprises: B1, B2, B3, B4, B5, B6, B7, B8, wherein B1, B2, B3, B4, B5, B6, B7, B8 are eight spectral reflectance respectively corresponding to the eight-band surface reflectance imagery in S2.

4. The method for monitoring wheat kernel moisture content in-field based on PlanetScope satellite imagery of claim 3, wherein S4 comprising:
   the broad-band vegetation indices in S4 comprises: Enhanced Vegetation Index (EVI), EVI, Green Normalized Difference Vegetation Index (GNDVI), Normalized Difference Vegetation Index (NDVI), Plant Senescence Reflectance Index (PSRI), Red Edge Chlorophyll Index (RECI), Red Edge Normalized Difference (RENDVI), Ratio Vegetation Index (RVI), Soil-Adjusted Vegetation Index (SAVI), Visible Atmospherically Resistant Index (VARI), and Wide Dynamic Range Vegetation Index (WDRVI).

5. The method for monitoring wheat kernel moisture content in-field based on PlanetScope satellite imagery of claim 4, wherein the calculations of the broad-band vegetable indices are as follows:

$$EVI=2.5\times(B8-B6)/((B8+6\times B6-7.5\times B2)+1);$$

$$RENDVI=(B8-B7)/(B8+B7);$$

$$GNDVI=(B8-B4)/(B8+B4);$$

$$RVI=B8/B6 \ NDVI=(B8-B6)/(B8+B6);$$

$$SAVI=1.5\times(B8-B6)/(B8+B6+L);$$

$$PSRI=(B6-B2)/B7;$$

$$VARI=(B4-B6)/(B4+B6-B2);$$

$$RECI=(B8/B7)-1; \text{ and}$$

$$WDRVI=(0.1\times B8-B6)/(0.1\times B8+B6).$$

6. The method for monitoring wheat kernel moisture content in-field based on PlanetScope satellite imagery of claim 1, wherein S5 comprising:
   the regressors comprise: Partial Least Squares Regression (PLSR), Random Forest Regression (RFR), and Support Vector Regression (SVR), wherein the comprehensively evaluated importance of expanded spectral features on the regressors are determined by taking the average of importance of the PLSR, the RFR and the SVR regressors.

7. The method for monitoring wheat kernel moisture content in-field based on PlanetScope satellite imagery of claim 1, wherein S6 comprising:
   the optimized GBDT inversion model for wheat kernel moisture content having optimal spectral feature domain is constructed by:
   randomly dividing wheat kernel moisture content samples into a training set and a testing set;

ranking the expanded spectral features in descending order based on the comprehensively evaluated importance in S5;

inputting number one of the ranked expanded spectral feature as the independent variable into the GBDT model to evaluate $R^2$ of the GBDT model on the training set and testing set, wherein $R^2$ is coefficient of determination;

inputting number one and next one of the expanded spectral feature as the independent variable into the GBDT model to reconstruct the GBDT model and evaluating $R^2$ of the GBDT model on the training set and the testing set again;

repeating the foregoing step by incrementally increasing the total number of inputted expanded spectral features until all expanded spectral feature are inputted at once, so as to obtain variation curve of R on the training and testing set of the GBDT model under different feature dimensions; and identifying inflection point on the $R^2$ curve, and selecting GBDT model corresponding to the inflection point as the optimized GBDT inversion model.

8. The method for monitoring wheat kernel moisture content in-field based on PlanetScope satellite imagery of claim 1, wherein S7 comprising:

according to optimal spectral feature domain in S6, extracting the desired original bands from original imagery and calculating desired broad-band vegetation indices to reconstruct multi-dimensional image; and inputting the multi-dimensional image pixel by pixel into the optimized GBDT inversion model in S6, so as to obtain distribution map of wheat kernel moisture content of the target farmland.

* * * * *